United States Patent [19]

Yamamoto et al.

[11] Patent Number: 5,292,825
[45] Date of Patent: Mar. 8, 1994

[54] VULCANIZABLE EPOXY GROUP-CONTAINING ELASTOMER COMPOSITION

[75] Inventors: Keisaku Yamamoto; Hideaki Yamada; Masahiro Fukuyama, all of Chiba, Japan

[73] Assignee: Sumitomo Chemical Company, Limited, Osaka, Japan

[21] Appl. No.: 578,905

[22] Filed: Sep. 7, 1990

[30] Foreign Application Priority Data

Sep. 8, 1989 [JP] Japan .................................. 1-234376

[51] Int. Cl.$^5$ .......................... C08F 8/30; C08L 63/08
[52] U.S. Cl. .................................. 525/340; 525/208; 525/327.3; 525/343; 525/347; 525/375; 525/379
[58] Field of Search .......................... 525/340, 347, 208

[56] References Cited

U.S. PATENT DOCUMENTS

| | | | |
|---|---|---|---|
| 2,970,983 | 2/1961 | Newey | 525/533 |
| 4,931,509 | 6/1990 | Yagishita | 525/208 |

FOREIGN PATENT DOCUMENTS

| | | |
|---|---|---|
| 0257640 | 2/1988 | European Pat. Off. |
| 1182172 | 6/1959 | France . |
| 2531969 | 2/1984 | France . |

OTHER PUBLICATIONS

Wada, M. et al. *J. Chem. Soc. Perkin Trans.* 1, 151, (1987).

*Primary Examiner*—Joseph L. Schofer
*Assistant Examiner*—Fred Zitomer
*Attorney, Agent, or Firm*—Sughrue, Mion, Zinn, Macpeak & Seas

[57] ABSTRACT

A vulcanizable epoxy group-containing elastomer composition is disclosed, comprising (A) an epoxy group-containing elastomer, (B) an organic compound containing at least two

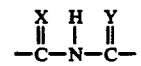

bonds, wherein X and Y, which may be the same or different, each represents an oxygen atom or a sulfur atom, per molecule or an organic compound containing at least two carboxyl groups per molecule, and (C) a phosphine compound represented by formula:

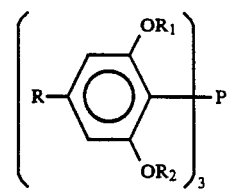

wherein $R_1$ and $R_2$, which may be the same or different, each represents an alkyl group having from 1 to 4 carbon atoms; and R represents a hydrogen atom or an alkoxy group having from 1 to 4 carbon atoms. The composition has excellent compression set, particularly in a high temperature atmosphere, as well as excellent mechanical characteristics.

6 Claims, No Drawings

VULCANIZABLE EPOXY GROUP-CONTAINING ELASTOMER COMPOSITION

FIELD OF THE INVENTION

This invention relates to a vulcanizable epoxy group-containing elastomer composition. More particularly, it relates to a vulcanizable epoxy group-containing elastomer composition having excellent mechanical characteristics, such as tensile strength, elongation, and hardness, and also excellent compression set in a high temperature atmosphere.

BACKGROUND OF THE INVENTION

Vulcanization systems commonly employed for epoxy group-containing elastomers in which epoxy groups function as crosslinking sites include polyamines, diamine carbamates, ammonium organic carboxylates, dithiocarbamates, and imidazoles. However, epoxy group-containing elastomers having been vulcanized with these vulcanization systems exhibit poor compression set, and achievement of satisfactory compression set requires long-time secondary vulcanization.

In order to eliminate the above-described disadvantage, various studies have been conducted on a vulcanization system which endows an epoxy group-containing elastomer with excellent compression set. For example, it has been proposed to add an organic compound having a specific structure and a quaternary ammonium or phosphonium salt to an epoxy group-containing elastomer as disclosed in JP-A-61-26620 and JP-A-63-57629 (the term "JP-A" as used herein means an "unexamined published Japanese patent application").

Demand for improved compression set has recently become more and more strict. For example, excellent compression set in a high temperature atmosphere, e.g., at 180° C. or even higher, has been demanded. In this connection, none of the so far proposed vulcanization systems including the above-mentioned ones does not impart excellent compression set to an epoxy group-containing elastomer even under such a severe condition.

SUMMARY OF THE INVENTION

An object of this invention is to settle the above-described problems and to provide a vulcanizable epoxy group-containing elastomer composition having excellent compression set even in a high temperature atmosphere, e.g., at 180° C. or higher.

The inventors have conducted extensive investigations on a vulcanizable elastomer composition excellent in compression set in a high temperature atmosphere as well as mechanical strength. As a result, it has now been found that the above object of this invention is accomplished by a vulcanizable epoxy group-containing elastomer composition comprising (A) an epoxy group-containing elastomer, (B) an organic compound containing at least two

bonds, wherein X and Y, which may be the same or different, each represents an oxygen atom or a sulfur atom, per molecule or an organic compound containing at least two carboxyl groups per molecule, and (C) a phosphine compound represented by formula:

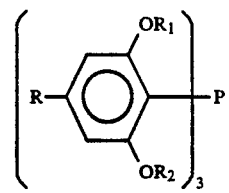

wherein $R_1$ and $R_2$, which may be the same or different, each represents an alkyl group having from 1 to 4 carbon atoms; and R represents a hydrogen atom or an alkoxy group having from 1 to 4 carbon atoms.

DETAILED DESCRIPTION OF THE INVENTION

The epoxy group-containing elastomer which can be used as component (A) includes (a) an epoxidized elastomer and (b) an epoxy group-containing elastomer obtained by polymerizing a monomer mixture comprising from 0.1 to 10% by weight, preferably from 0.5 to 3% by weight, of an epoxy group-containing monomer and from 90.0 to 99.9% by weight, preferably from 97 to 99.5% by weight, of at least one copolymerizable monomer terminated with a vinyl group or a vinylidene group by a known technique, e.g., emulsion polymerization, suspension polymerization, solution polymerization, and bulk polymerization.

Epoxy groups in the epoxy group-containing monomer function as crosslinking sites. Specific examples of such a monomer include glycidyl acrylate, glycidyl methacrylate, vinyl glycidyl ether, allyl glycidyl ether, and methallyl glycidyl ether, with glycidyl acrylate and glycidyl methacrylate being preferred.

Examples of the monomer terminated with a vinyl group or a vinylidene group which is copolymerizable with the epoxy group-containing monomer include acrylates, e.g., methyl acrylate, ethyl acrylate, propyl acrylate, n-butyl acrylate, n-octyl acrylate, methoxymethyl acrylate, methoxyethyl acrylate, and ethoxyethyl acrylate; methacrylates corresponding to these acrylates; vinyl esters, e.g., vinyl acetate, vinyl propionate, and vinyl butyrate; vinyl ketones, e.g., methyl vinyl ketone and ethyl vinyl ketone; vinyl aromatic compounds, e.g., styrene, α-methylstyrene, and vinyltoluene; conjugated dienes, e.g., butadiene and isoprene; α-monoolefins, e.g., ethylene, propylene, and 1-butene; vinyl monomers containing a hydroxyl group, e.g., β-hydroxyethyl acrylate and 4-hydroxybutyl acrylate; and vinyl or vinylidene monomers containing a nitrile group, e.g., acrylonitrile, methacrylonitrile, and β-cyanoethyl acrylate. These monomers may be used either alone or in combination of two or more thereof.

Any of elastomers obtained by copolymerizing an epoxy group-containing monomer or epoxidizing an elastomer can be used as component (A) as long as it has epoxy groups as crosslinking sites.

Specific examples of suitable epoxy group-containing elastomers as component (A) include epoxy group-containing acrylate copolymer elastomers, epoxy group-containing ethylene-vinyl acetate copolymer elastomers, epoxy group-containing ethylene-acrylate copolymer elastomers, epoxy group-containing ethylene-vinyl acetate-acrylate copolymer elastomers, epoxy group-containing ethylene-propylene copolymer elastomers, epoxy group-containing butadiene-acrylonitrile copolymer elastomers, epoxy group-containing acrylate-acrylonitrile copolymer elastomers, epoxy group-containing butadiene-styrene copolymer elastomers, and epoxy group-containing butadiene-acrylonitrileacrylate copolymer elastomers. These elastomers can be used alone or in admixture of two or more thereof.

Component (B) which can be used in the present invention is an organic compound containing at least two linkages represented by formula

(wherein X and Y, which may be the same or different, each represents an oxygen atom or a sulfur atom) per molecule or an organic compound containing at least two carboxyl groups per molecule.

Compounds containing at least two

linkages per molecule include heterocyclic compounds, aromatic compounds, and aliphatic compounds. The two or more

linkages may be present either separately in the molecule or as connected to each other to form a unit, e.g.,

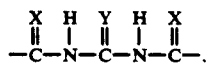

Further, the linkage(s) may be present as a substituent group(s) of a heterocyclic compound, not as a member forming the heterocyclic ring.

Examples of suitable heterocyclic compounds are parabanic acid, alloxan, alloxantin, alloxan-5-oxime, barbituric acid, 5-hydroxybarbituric acid, 5-benzalbarbituric acid, 5-aminobarbituric acid, 5-hydroxyiminobarbituric acid, 5,5-diethylbarbituric acid, 5-ethyl-5-phenylbarbituric acid (barbital), 5-(1-methylbutyl)-5-(allyl)barbituric acid, 5,5-diallylbarbituric acid, isocyanuric acid, and pseudouric acid, and compounds wherein the oxygen atom in the

group of the above-enumerated compounds is substituted by a sulfur atom, as well as 2,4-dithiobarbituric acid and 2-thiobarbituric acid.

Examples of suitable aromatic compounds are pyromellitic acid diimide, mellitic acid triimide, and 1,4,5,8-naphthaldiimide; and corresponding thioimides.

Examples of suitable aliphatic compounds are triuret, 1-methyltriuret, 1,1-diethyltriuret, and tetrauret; and corresponding thiourets.

Compounds containing at least two carboxyl groups per molecule are generally selected from saturated or unsaturated aliphatic compounds, alicyclic compounds, aromatic compounds, and low-molecular weight polymers. Compounds containing an alicyclic group, an aromatic group or a hetero atom in the main chain thereof can also be employed.

Specific but non-limiting examples of suitable compounds containing at least two carboxyl groups include aliphatic compounds, e.g., malonic acid, succinic acid, glutaric acid, adipic acid, pimelic acid, azelaic acid, sebacic acid, octanedicarboxylic acid, dodecanedicarboxylic acid, tridecanedicarboxylic acid, tetradecanedicarboxylic acid hexadecanedicarboxylic acid, octadecanedicarboxylic acid, eicosanedicarboxylic acid, tartrylic acid, methyltartrylic acid, methylmalonic acid, ethylmalonic acid, tetramethylsuccinic acid, 2,2'-dimethylsuccinic acid, malic acid, α-methylmalic acid, α-hydroxyglutaric acid, α-hydroxyadipic acid, oxosuccinic acid, 2-oxoadipic acid, acetylmalonic acid, 2-acetylglutaric acid, β-hydroxyglutaric acid, maleic acid, citraconic acid, glutaconic acid, muconic acid, citric acid, tartaric acid, 1,2,3-propanetricarboxylic acid, 1,2,3-propenetricarboxylic acid, 1,3,5-pentanetricarboxylic acid, cystine, aspartic acid, glutamic acid, β-hydroxyglutamic acid, iminodiacetic acid, nitrilotriacetic acid, and ethylenediaminetetraacetic acid; alicyclic compounds, e.g., cis-1,3-cyclopentanedicarboxylic acid, cis-1,4-cyclohexanedicarboxylic acid, 1,5-cyclooctanedicarboxylic acid, and hexahydroterephthalic acid; aromatic compounds, e.g., phthalic acid, 3-methylphthalic acid, terephthalic acid, phthalonic acid, hydroxyterephthalic acid, hemipinic acid, benzophenonedicarboxylic acid, phenylsuccinic acid, trimellitic acid, and pyromellitic acid; compounds containing an aromatic group in the main chain thereof, e.g., 7,8-diphenyltetradecanedicarboxylic acid; and low-molecular weight polymers, e.g., carboxyl-terminated (both terminals) polybutadiene and carboxyl-terminated (both terminals) butadiene-acrylonitrile copolymers, and carboxylic acid-containing liquid butadiene-acrylonitrile copolymers having a carboxyl group in the molecular chain thereof.

Of the above-mentioned carboxyl group-containing compounds, aliphatic dicarboxylic acids are particularly preferred from the standpoints of compression set and low-temperature characteristics.

Component (B) may be added during or after completion of polymerization reaction of the epoxy group-containing elastomer (A). It may also be added to the elastomer together with other compounding additives, such as a reinforcing agent, by means of a kneading machine generally employed in the rubber industry.

Component (B) is usually used in an amount of from 0.1 to 10 parts by weight per 100 parts by weight of the epoxy group-containing elastomer (A). A preferred amount can be selected appropriately in view of rate of cure, mechanical characteristics of the vulcanized product, compression set, and the like. In general, with an amount less than 0.1 part by weight, the crosslinking density tends to be reduced, while with an amount exceeding 10 parts by weight, the crosslinking density tends to be too high for practical use. The most preferred range is from 0.2 to 5 parts by weight.

Component (C) is a phosphine compound represented by formula:

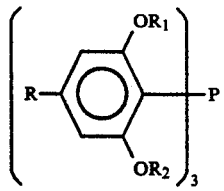

wherein $R_1$ and $R_2$, which may be the same or different, each represents an alkyl group having from 1 to 4 carbon atoms, preferably a methyl group; and R represents a hydrogen atom or an alkoxy group having from 1 to 4 carbon atoms, preferably a hydrogen atom.

Specific examples of the phosphine compound of the above formula include tris(2,6-dimethoxyphenyl)phosphine, tris(2,6-diethoxyphenyl)phosphine, tris(2,6-di-n-propoxyphenyl)phosphine, tris(2,6-diisopropoxyphenyl)phosphine, tris(2,6-dibutoxyphenyl)phosphine, tris(2,4,6-trimethoxyphenyl)phosphine, tris(2,4,6-triethoxyphenyl)phosphine, tris(2,4,6-tri-n-propoxyphenyl)phosphine, tris(2,4,6-triisopropoxyphenyl)phosphine, and tris(2,4,6-tributoxyphenyl)phosphine. These phosphine compounds may be used either alone or in combination of two or more thereof.

The phosphine compound (C) is usually used in an amount of from 0.1 to 10 parts by weight per 100 parts by weight of the epoxy group-containing elastomer (A). A preferred amount is appropriately decided in view of rate of cure, processing stability, preservation stability, mechanical characteristics of the vulcanized product, compression set, and the like. In general, with an amount less than 0.1 part by weight, progress of vulcanization is insufficient. If the amount exceeds 10 parts by weight, the rate of cure becomes extremely high, resulting in impairment of processing stability and preservation stability. The most preferred range of the amount is from 0.1 to 5 parts.

The vulcanizable epoxy group-containing elastomer composition according to the present invention may further contain (D) a compound containing one

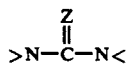

bond, wherein Z represents an oxygen atom or a sulfur atom, per molecule. Examples of such a compound include aliphaticureas, e.g., urea, N-methylurea, N-ethylurea, N,N-dimethylurea, N,N-diethylurea, N,N'-diethylurea, N,N'-ethylideneurea, N-acetylurea, N-acetyl-N'-methylurea, N,N'-dimethylolurea, tetramethylurea, carbamylurea, and carbamoylcarbamic acid, and corresponding aliphatic thioureas; aromatic ureas, e.g., phenylurea, N-ethyl-N'-phenylurea, N,N'-diphenylurea, N,N-diphenylurea, N-acetyl-N-phenylurea, N-benzoylurea, tetraphenylurea, and N,N-dimethyl-N,N'-dichlorophenylurea, and corresponding aromatic thioureas; and heterocyclic ureas, e.g., ethyleneurea, glycolylurea, dimethylparabanic acid, benzimidazolone, and 5-methyluracil, and corresponding heterocyclic thioureas. These compounds may be used either alone or in combination of two or more thereof.

While component (D) is not essential in the present invention, it is preferable to use component (D) from the viewpoints of improvements in scorch stability, mechanical characteristics of the vulcanized product, and compression set. Component (D) is usually used in an amount of from 0.1 to 10 parts by weight, preferably from 0.1 to 5 parts by weight, per 100 parts by weight of the epoxy group-containing elastomer (A). If the amount is less than 0.1 part by weight, a sufficient effect of controlling the rate of cure cannot be produced. If it exceeds 10 parts by weight, the rate of cure is reduced unfavorably for practical use.

The vulcanizable epoxy group-containing elastomer composition can be obtained by mixing the above-described components (A), (B), (C) and, if desired, component (D) as well as other compounding additives commonly employed in the art, e.g., reinforcing agents, fillers, plasticizers, antioxidants, stabilizers, and processing aids, by means of a conventional kneading machine, e.g., a roll mill and a Banbury mixer.

The composition is molded into a desired shape according to the purpose and subjected to vulcanization to obtain a final product.

Vulcanization of the composition is carried out at a temperature usually of not lower than 120° C., preferably from about 150° to about 220° C., for a period of from 1 to 60 minutes. When the thus vulcanized product is subjected to secondary vulcanization at a temperature of from about 150° to about 200° C. for a relatively short time of, e.g., from 4 to 16 hours, compression set in a high temperature atmosphere can be greatly improved.

The vulcanizable epoxy group-containing elastomer composition according to the present invention has excellent compression set not only at a conventional temperature (about 150° C.) but at a higher temperature (e.g., 180° C. or higher) and also excellent mechanical characteristics. Because of these excellent performance characteristics, the composition of the present invention is useful in a broad range of application, such as various sealing materials, e.g., gaskets, packings, O-rings, and oil seals, various hoses, various belts, and rollers.

The present invention is now illustrated in greater detail by reference to Examples and Comparative Examples, but it should be understood that the present invention is not deemed to be limited thereto. All the parts, percents, and ratios are by weight unless otherwise indicated.

EXAMPLES 1 TO 6 AND COMPARATIVE EXAMPLES 1 TO 5

A hundred parts of an ethylene-methyl acrylate-glycidyl methacrylate copolymer having a composition shown in Table 1 below as epoxy group-containing elastomer (A), 40 parts of FEF carbon black ("Seast SO ®" produced by Tokai Carbon Co., Ltd.), 2 parts of an amine type antioxidant ("Naugard ® 445" produced by Uniroyal Corp.), 1 part of stearic acid, and other compounding additives shown in Table 2 below were kneaded by using an 8-inch roller.

Each of the resulting blends was press cured at 170° C. for 20 minutes and then subjected to secondary vulcanization at 185° C. for 4 hours in a Geer oven.

Vulcanization characteristics of each of the resulting vulcanized products were all measured according to JIS K6301, except that the scorch time was measured according to JIS K6300 in which a torque five-point up value was taken as the scorch time. The results obtained are shown in Table 2.

EXAMPLE 7 AND COMPARATIVE EXAMPLES 6 AND 7

The same procedures as in Examples 1 to 6 were repeated, except for using an epoxy group-containing acrylic rubber ("AR-31" produced by Nippon Zeon Co., Ltd.) as epoxy group-containing elastomer (A) and using other compounding additives as shown in Table 2. The results of measurements are shown in Table 2.

TABLE 1

| Component | Amount (wt%) |
| --- | --- |
| Ethylene | 38 |
| Methyl acrylate | 60 |
| Glycidyl methacrylate | 2 |

TABLE 2

| | Example | | | | | | Comparative Example | | | | | Ex. | Compar. Example | |
| --- | --- | --- | --- | --- | --- | --- | --- | --- | --- | --- | --- | --- | --- | --- |
| | 1 | 2 | 3 | 4 | 5 | 6 | 1 | 2 | 3 | 4 | 5 | 7 | 6 | 7 |
| Composition (parts per 100 parts of (A)): | | | | | | | | | | | | | | |
| Isocyanuric acid (B) | 0.8 | 0.8 | 0.8 | 1.5 | 0.8 | — | 2.0 | 0.8 | 0.8 | — | 0.8 | 2.0 | 2.0 | 2.0 |
| Eicosanedicarboxylic acid (B) | — | — | — | — | — | 1.0 | — | — | — | 1.0 | — | — | — | — |
| Tris(2,6-dimethoxyphenyl)phosphine (C) | 1.0 | 0.5 | 1.0 | 1.0 | 1.0 | 1.0 | — | — | — | — | — | 1.0 | — | — |
| N,N-Diphenylurea (D) | 2.3 | 2.3 | 3.0 | 2.3 | — | — | 1.5 | 0.5 | 2.3 | — | — | 1.5 | 1.5 | 1.5 |
| Tetra-n-butylphosphonium bromide | — | — | — | — | — | — | 1.5 | 2.3 | — | — | — | — | 1.5 | — |
| Octadecyltrimethylammonium bromide | — | — | — | — | — | — | — | — | 1.5 | 1.0 | — | — | — | — |
| Benzyltriphenylphosphonium chloride | — | — | — | — | — | — | — | — | — | — | — | — | — | 1.5 |
| Triphenyl phosphine | — | — | — | — | — | — | — | — | — | — | 1.5 | — | — | — |
| Results of Measurements: | | | | | | | | | | | | | | |
| Scorch time, t-5 ML 125° C. (min) | 16.2 | 33.1 | 19.0 | 16.7 | 3.2 | 5.9 | 13.1 | 43.7 | 20.0 | 28.6 | — | 6.3 | 9.3 | 17.1 |
| Tensile Strength (kgf/cm$^2$) | 185 | 181 | 186 | 192 | 181 | 195 | 111 | 154 | 180 | 195 | — | 124 | 83 | 113 |
| Elongation (%) | 360 | 340 | 370 | 360 | 350 | 430 | 130 | 260 | 420 | 500 | — | 240 | 140 | 280 |
| Hardness (JIS-A) | 62 | 62 | 63 | 62 | 62 | 61 | 71 | 68 | 65 | 59 | — | 54 | 63 | 57 |
| Compression Set (%): | | | | | | | | | | | | | | |
| 150° C. × 70 hrs. | 20 | 17 | 20 | 20 | 28 | 33 | 57 | 28 | 40 | 34 | — | 17 | 28 | 19 |
| 185° C. × 70 hrs. | 46 | 44 | 45 | 46 | 54 | 60 | 93 | 90 | 88 | 66 | — | 39 | 91 | 63 |

(Note)
The composition of Comparative Example 5 was not vulcanized.

As described above, the present invention provides a vulcanizable epoxy group-containing elastomer composition having greatly improved compression set, particularly in a high temperature atmosphere of 180° C. or more, without impairing mechanical characteristics, such as tensile strength, elongation, and hardness.

While the invention has been described in detail and with reference to specific embodiments thereof, it will be apparent to one skilled in the art that various changes and modifications can be made therein without departing from the spirit and scope thereof.

What is claimed is:

1. A vulcanizable epoxy group-containing elastomer composition comprising (A) an epoxy group-containing elastomer, (B) an organic compound containing at least two

bonds, wherein X and Y, which may be the same or different, each represents an oxygen atom or a sulfur atom, per molecule or an organic compound containing at least two carboxyl groups per molecule, and (C) a phosphine compound represented by formula:

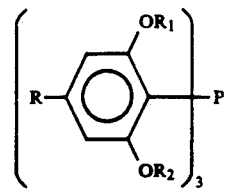

wherein $R_1$ and $R_2$, which may be the same or different, each represents an alkyl group having from 1 to 4 carbon atoms; and R represents a hydrogen atom or an alkoxy group having from 1 to 4 carbon atoms, wherein component (B) is present in an amount of from 0.2 to 5 parts by weight per 100 of the component (A), and wherein component (C) is present in an amount of from 0.1 to 5 parts by weight of 100 parts by weight of component (A).

2. A vulcanizable epoxy group-containing elastomer composition as claimed in claim 1, wherein the composition further contains (D) a compound containing one $$>N-\overset{\overset{Z}{\|}}{C}-N<$$

bond, wherein Z represents an oxygen atom or a sulfur atom, per molecule.

3. A vulcanizable epoxy group-containing elastomer composition as claimed in claim 2, wherein the component (D) is present in an amount of from 0.1 to 5 parts by weight per 100 parts by weight of component (A).

4. A vulcanizable epoxy group-containing elastomer composition as claimed in claim 1, wherein R represents a hydrogen atom.

5. A vulcanizable epoxy group-containing elastomer composition as claimed in claim 1, wherein $R_1$ and $R_2$ each represents a methyl group.

6. A vulcanizable epoxy group-containing elastomer composition as claimed in claim 1, wherein the component (A) is at least one epoxy group-containing elastomer selected from the group consisting of epoxy group-containing acrylate copolymer elastomers, epoxy group-containing ethylene-vinyl acetate copolymer elastomers, epoxy group-containing ethylene-acrylate copolymer elastomers, epoxy group-containing ethylene-vinyl acetate-acrylate copolymer elastomers, epoxy group-containing ethylene-propylene copolymer elastomers, epoxy group-containing butadiene-acrylonitrile copolymer elastomers, epoxy group-containing acrylate-acrylonitrile copolymer elastomers, epoxy group-containing butadiene-styrene copolymer elastomers, and epoxy group-containing butadiene-acrylonitrile-acrylate copolymer elastomers.

* * * * *